(12) United States Patent
Payton

(10) Patent No.: US 7,187,798 B1
(45) Date of Patent: Mar. 6, 2007

(54) REGION-BASED KARHUNEN-LOEVE TRANSFORMATION

(75) Inventor: Paul M. Payton, Burlingame, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/985,999

(22) Filed: Nov. 12, 2004

Related U.S. Application Data

(63) Continuation-in-part of application No. 10/870,422, filed on Jun. 18, 2004, which is a continuation of application No. 09/625,859, filed on Jul. 26, 2000, now Pat. No. 6,754,383.

(51) Int. Cl.
*G06K 9/00* (2006.01)
*G06K 9/36* (2006.01)

(52) U.S. Cl. .................................... 382/166
(58) Field of Classification Search ............... 382/162, 382/166, 232, 233, 240, 244, 248, 250, 251; 358/523, 525; 348/224.1, 333.03; 345/600–604, 345/619; 375/240.03, 240.11, 240.18, 240.19, 375/240.2
See application file for complete search history.

(56) References Cited

U.S. PATENT DOCUMENTS

| | | | |
|---|---|---|---|
| 5,014,198 A | 5/1991 | Umemura | |
| 5,196,946 A | 3/1993 | Balkanski et al. | |
| 5,253,078 A | 10/1993 | Balkanski et al. | |
| 5,422,736 A | 6/1995 | Katayama | |
| 5,465,164 A | 11/1995 | Sugiura et al. | |
| 5,680,129 A | 10/1997 | Weinberger et al. | |
| 5,798,753 A * | 8/1998 | Zhou et al. | 345/603 |
| 5,982,432 A | 11/1999 | Uenoyama et al. | |
| 6,049,775 A | 4/2000 | Gertner et al. | |
| 6,125,201 A | 9/2000 | Zador | |
| 6,157,734 A * | 12/2000 | Iida | 382/162 |
| 6,195,466 B1 | 2/2001 | Schwartz et al. | |
| 6,236,749 B1 | 5/2001 | Satonaka et al. | |
| 6,259,741 B1 * | 7/2001 | Chen et al. | 375/240.26 |
| 6,266,440 B1 | 7/2001 | Oneda | |
| 6,308,193 B1 | 10/2001 | Jang et al. | |
| 6,320,981 B1 * | 11/2001 | Yada | 382/168 |
| 6,404,928 B1 | 6/2002 | Shaw et al. | |
| 6,427,029 B1 * | 7/2002 | Kono et al. | 382/248 |
| 6,453,072 B1 | 9/2002 | Hatakenaka | |
| 6,453,073 B2 | 9/2002 | Johnson | |
| 6,584,232 B2 * | 6/2003 | Kobayashi | 382/251 |
| 6,597,815 B1 * | 7/2003 | Satoh et al. | 382/251 |
| 6,665,446 B1 * | 12/2003 | Kato | 382/251 |
| 6,754,383 B1 | 6/2004 | Payton | |
| 6,832,006 B2 | 12/2004 | Savakis et al. | |
| 6,868,190 B1 | 3/2005 | Morton | |
| 6,891,975 B2 * | 5/2005 | Okada | 382/243 |
| 6,917,384 B1 * | 7/2005 | Fukushima | 348/333.03 |

(Continued)

OTHER PUBLICATIONS

"ERDAS Field Guide, Fifth Edition, Revised and Expanded", 1999, pp. 238-466, ERDAS, Inc., Atlanta, Georgia.

(Continued)

*Primary Examiner*—Amir Alavi
(74) *Attorney, Agent, or Firm*—McDermott Will & Emery LLP.

(57) ABSTRACT

A region-based Karhunen-Loeve transformational method for compressing a color image. The method includes the steps of converting color image information for the color image into partitioned intrinsic color information, transforming the partitioned intrinsic color information into transformed information, and quantizing the transformed information into quantized information. The method further includes the steps of encoding the quantized information into encoded information, and storing the encoded information.

30 Claims, 9 Drawing Sheets

U.S. PATENT DOCUMENTS

2003/0016233 A1     1/2003     Charpentier
2003/0174896 A1     9/2003     Ridge
2004/0212692 A1    10/2004     Nakami et al.
2004/0258301 A1    12/2004     Payton

OTHER PUBLICATIONS

European Search Report dated Mar. 18, 2005, in EP 01850124.7.

"Three-Dimensional Transform Coding Of Multispectral Data", by John A. Saghri, et al., 1993 IEEE, pp. 1342-1346.

"Terrain-Adaptive Transform Coding Of Multispectral Data", by John A. Saghri, et al., 1994 IEEE, pp. 313-316.

"Coding Of Spectrally Homogenous Regions In Multispectral Image Compression", by Gabriel Fernandez, et al., 1996 IEEE, pp. 923-926.

"An Efficient Adaptive KLT For Multispectral Image Compression", by Lena Chang, et al., 2000 IEEE, pp. 252-255.

* cited by examiner $$|r'*r' \quad r'*g' \quad r'*b'| \qquad r'=r-m_r$$
$$|g'*r' \quad g'*g' \quad g'*b'| \qquad g'=g-m_g$$
$$|b'*r' \quad b'*g' \quad b'*b'| \qquad b'=b-m_b$$

REGION-BASED KARHUNEN-LOEVE TRANSFORMATION

CROSS-REFERENCE

This application is a continuation-in-part application of U.S. patent application Ser. No. 10/870,422, filed Jun. 18, 2004, which is a continuation of U.S. patent application Ser. No. 09/625,859, filed Jul. 26, 2000 (issued as U.S. Pat. No. 6,754,383 on Jun. 22, 2004), both of which are incorporated herein for all purposes.

STATEMENT AS TO RIGHTS TO INVENTIONS MADE UNDER FEDERALLY SPONSORED RESEARCH OR DEVELOPMENT

Not Applicable.

FIELD OF INVENTION

The present invention relates to true color image compression and reconstruction and, more particularly, relates to lossy compression and reconstruction of large color images by partitioning an image into non-overlapping regions with distinct color histograms, using an iterative region-growing algorithm.

BACKGROUND OF THE INVENTION

Short for "discrete cosine transform," a DCT is a technique for representing waveform data as a weighted sum of cosines, and is commonly used for image compression. Closely related to the discrete Fourier transform ("DFT"), discrete cosine transformations involve manipulation of real numbers only, offering energy compaction improvements over DFT by eliminating artificial discontinuities that appear in DFTs.

Similarly, discrete wavelet transforms ("DWT") are designed to decorrelate an image, decomposing an image block into several subbands, and transforming an image data signal into two or more decimated signals corresponding to different frequency bands. The subbands consist of coefficients that describe the horizontal and vertical spatial frequency characteristics of the original tile component. The DWT generally results in the signal energy being concentrated in a small number of subbands, and the subbands subsequently tend to compress more easily than the original image.

Attributed to these and other appealing qualities, DCTs and DWTs are popularly deployed in a broad class of decoding techniques, known as transform coding or block quantization, which attempt to reduce image signal redundancy by representing signals with a new set of orthogonal bases, reducing the spatial correlations that occur between adjacent pixels. Using DCTs and DWTs, merely a fraction of the transform coefficients are encoded, with tolerable deterioration in image fidelity. JPEG and JPEG 2000 are examples of well known image compression mechanisms which utilize DCT and DWT, respectively.

One problem common to conventional DCT and DWT-based image compression algorithms relates to the wide disparity in color composition found in large images, such as images measuring 2048 pixels ×2048 pixels or larger. Widely disparate color compositions thwart DCT and DWT algorithms, which are most effective when color statistics of encoded blocks are similar. In order to reduce color composition disparity in large images, the conventional image compression algorithms partition an image into fixed blocks of N×N pixels, where N is either arbitrary, or based upon predetermined simulation results of other natural images.

The choice of block sizes is crucial, since the selection of too large of a block can include more than one region with different frequency properties, while the selection of too small of a block results in less efficient image compression. As such, it is a disadvantage of the conventional image compression mechanisms to choose block sizes which are not tailored to the individual images being compressed, and which do not compensate for regions of similar frequency properties. By ignoring these similar regions, conventional image compression mechanisms suffer from increased loss of coefficient magnitudes, decreased overall compression efficiency and increased time required to transmit compressed images.

It is therefore considered highly desirable to provide an enhanced mechanism for compressing images which groups regions or blocks of data with similar frequency properties, in order to increase compression efficiency. In particular, it is desirable to have an iterative region-growing algorithm for partitioned images, which grows regions based on the similarity or difference of color characteristics of non-overlapping regions of the image, resulting in more efficient block coding.

SUMMARY OF THE INVENTION

The present invention relates to true color image compression and reconstruction and, more particularly, relates to lossy compression and reconstruction of color images by partitioning an image into non-overlapping regions with distinct color histograms, using an iterative region-growing algorithm.

Based on the foregoing discussion, it can be appreciated that there presently exists a need in the art for a computer system and corresponding operating method which overcomes the above-described deficiencies of the prior art. The present invention overcomes several key shortcomings, particularly those drawbacks which relate to arbitrarily-determined, fixed block sizes used by the conventional DCT-based or DWT-based image compression mechanisms.

It is a feature and advantage of the present invention to provide an image compression and reconstruction technique that improves the image quality of a reconstructed image, by reducing image quality degradation at high compression ratios. As such, the present invention optimizes utilization of file space, and reduces the transmission time required to transmit compressed images.

It is a further feature and advantage of the invention to compress a color image, utilizing an iterative region-growing algorithm on partitioned images, which grows regions based on the similarity or difference of color characteristics of non-overlapping regions of the image, resulting in more efficient block coding.

The present invention is a system, method, and computer program product for compression and reconstruction of a color image using principal components transformation. The method, which is performed on a computer or other programmable data processing apparatus, is a variant of the conventional JPEG or JPEG 2000 image compression mechanisms.

According to one aspect, the present invention is a computer-readable storage medium in which is stored a program for compressing a color image. The program includes codes for permitting the computer to perform a converting step for converting color image information for the color image into partitioned intrinsic color information, a transforming step for transforming the partitioned intrinsic color information into transformed information, and a quantizing step for quantizing the transformed information into quantized information. The program further includes codes for permitting the computer to perform an encoding step for encoding the quantized information into encoded information, and a storing step for storing the encoded information.

During the converting step, the program further includes codes for permitting the computer to perform a partitioning step for partitioning the color image information into a plurality of regions, including at least first and second adjacent regions, a first computing step for computing a mean vector and a covariance matrix for each of the plurality of regions, and a second computing step for computing divergence $D_{ij}$, transformed divergence $TD_{ij}$, and/or Jeffries-Matusita distance $JM_{ij}$ for the first and second adjacent regions. Furthermore, during the converting step, the program also includes codes for permitting the computer to perform a merging step for merging the first and second adjacent regions, if $D_{ij}$, $TD_{ij}$, or $JM_{ij}$ indicate poor separation.

During the converting step, the program further includes codes for permitting the computer to perform a third computing step for computing a mean vector and a covariance matrix for the merged first and second adjacent region, and a fourth computing step for computing $D_{ij}$, $TD_{ij}$, and/or $JM_{ij}$ between the merged first and second adjacent region and a third adjacent region adjacent to the merged first and second adjacent region. Moreover, during the converting step, the program includes codes for permitting the computer to perform a second merging step for merging the merged first and second adjacent region with the third adjacent region, if $D_{ij}$, $TD_{ij}$, or $JM_{ij}$ indicate poor separation between the merged first and second adjacent region and the third adjacent region.

Each of the plurality of regions is rectilinear, where each of the plurality of regions measures K pixels ×L pixels.

$D_{ij}$ is expressed by Equation (1), below:

$$D_{ij} = \frac{1}{2}tr((C_i - C_j)(C_i^{-1} - C_j^{-1})) + \frac{1}{2}tr((C_i^{-1} - C_j^{-1})(\mu_i - \mu_j)(\mu_i - \mu_j)^T), \quad (1)$$

In Equation (1), $C_i$ represents the covariance matrix for the first region, $C_j$ represents the covariance matrix for the second region, $\mu_i$ represents the mean vector for the first region, $\mu_j$ represents the mean vector for the second region, tr represents a trace function, and T represents a transposition function.

$TD_{ij}$ is expressed by Equations (1) and (2), below:

$$D_{ij} = \frac{1}{2}tr((C_i - C_j)(C_i^{-1} - C_j^{-1})) + \frac{1}{2}tr((C_i^{-1} - C_j^{-1})(\mu_i - \mu_j)(\mu_i - \mu_j)^T) \quad (1)$$

$$TD_{ij} = 2000\left(1 - \exp\left(\frac{-\text{Abs}(D_{ij})}{8}\right)\right), \quad (2)$$

In Equations (1) and (2), $C_i$ represents the covariance matrix for the first region, $C_j$ represents the covariance matrix for the second region, $\mu_i$ represents the mean vector for the first region, $\mu_j$ represents the mean vector for the second region, tr represents a trace function, and T represents a transposition function. Furthermore, Abs( ) represents the absolute value function.

$JM_{ij}$ is expressed by Equations (3) and (4), below:

$$a = \frac{1}{8}(\mu_i - \mu_j)^T\left(\frac{C_i + C_j}{2}\right)^{-1}(\mu_i - \mu_j) + \frac{1}{2}\ln\left(\frac{|(C_i + C_j)/2|}{\sqrt{\text{Abs}(|C_i| \times |C_j|)}}\right) \quad (3)$$

$$JM_{ij} = 1000 \times \sqrt{2(1 - e^{-a})}, \quad (4)$$

In Equations (3) and (4), $C_i$ represents the covariance matrix for the first region, $C_j$ represents the covariance matrix for the second region, $\mu_i$ represents the mean vector for the first region, $\mu_j$ represents the mean vector for the second region, $|C_i|$ represents a determinant of $C_i$, and $|C_j|$ represents a determinant of $C_j$. Additionally, Abs ( ) represents the absolute value function.

Poor separation is indicated if $TD_{ij}$ is between 0 and 1700, or if $JM_{ij}$ is between 0 and 1000. In alternate arrangements, K equals L, K and/or L are 256, or K and/or L are 512, initially. The color image comprises greater than or equal to 4,000,000 pixels.

The transforming step uses a discrete cosine transform, such as the JPEG discrete cosine transform, or a discrete wavelet transform, such as the JPEG 2000 discrete wavelet transform. During the converting step, the program further includes codes for permitting the computer to perform an establishing step for establishing a principal components space, a generating step for generating intrinsic values, and a determining step for determining scale factors.

According to a second aspect, the present invention is a method for compressing a color image. The method includes the steps of converting color image information for the color image into partitioned intrinsic color information, transforming the partitioned intrinsic color information into transformed information, and quantizing the transformed information into quantized information. The method further includes the steps of encoding the quantized information into encoded information, and storing the encoded information.

According to a third aspect, the present invention is a method for compressing and reconstructing a color image. The method includes the steps of converting color image information for the color image into partitioned intrinsic color information, transforming the partitioned intrinsic color information into transformed information, and quantizing the transformed information into quantized information. Additionally, the method includes the steps of encoding the quantized information into encoded information, storing the encoded information, and reconstructing the encoded information.

According to a fourth aspect, the present invention is a system for compressing a color image, including a memory for storing color image information for the color image, and a computer processor for compressing the stored color image information. The computer processor performs the steps of converting color image information for a color image into partitioned intrinsic color information, transforming the partitioned intrinsic color information into transformed information, and quantizing the transformed information into quantized information. The computer processor further performs the steps of encoding the quantized information into encoded information, and storing the encoded information.

The present invention optimizes channel usage, resulting in less degradation in image quality while allowing greater compression ratios over conventional, fixed transformation techniques. The present invention is particularly relevant to DCT-based or DWT-based compression techniques, since the range of compression ratios is extended, while image quality is maintained at high compression ratios.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout.

DETAILED DESCRIPTION OF THE INVENTION

The present invention provides an enhanced mechanism for compressing images, by iteratively grouping regions or blocks of data with similar frequency properties, in order to increase compression efficiency. In particular, the present invention provides an iterative region-growing algorithm for a partitioned image, which grows regions based on the similarity or difference of color characteristics of non-overlapping regions of the image, resulting in more efficient block coding.

Figure 1:
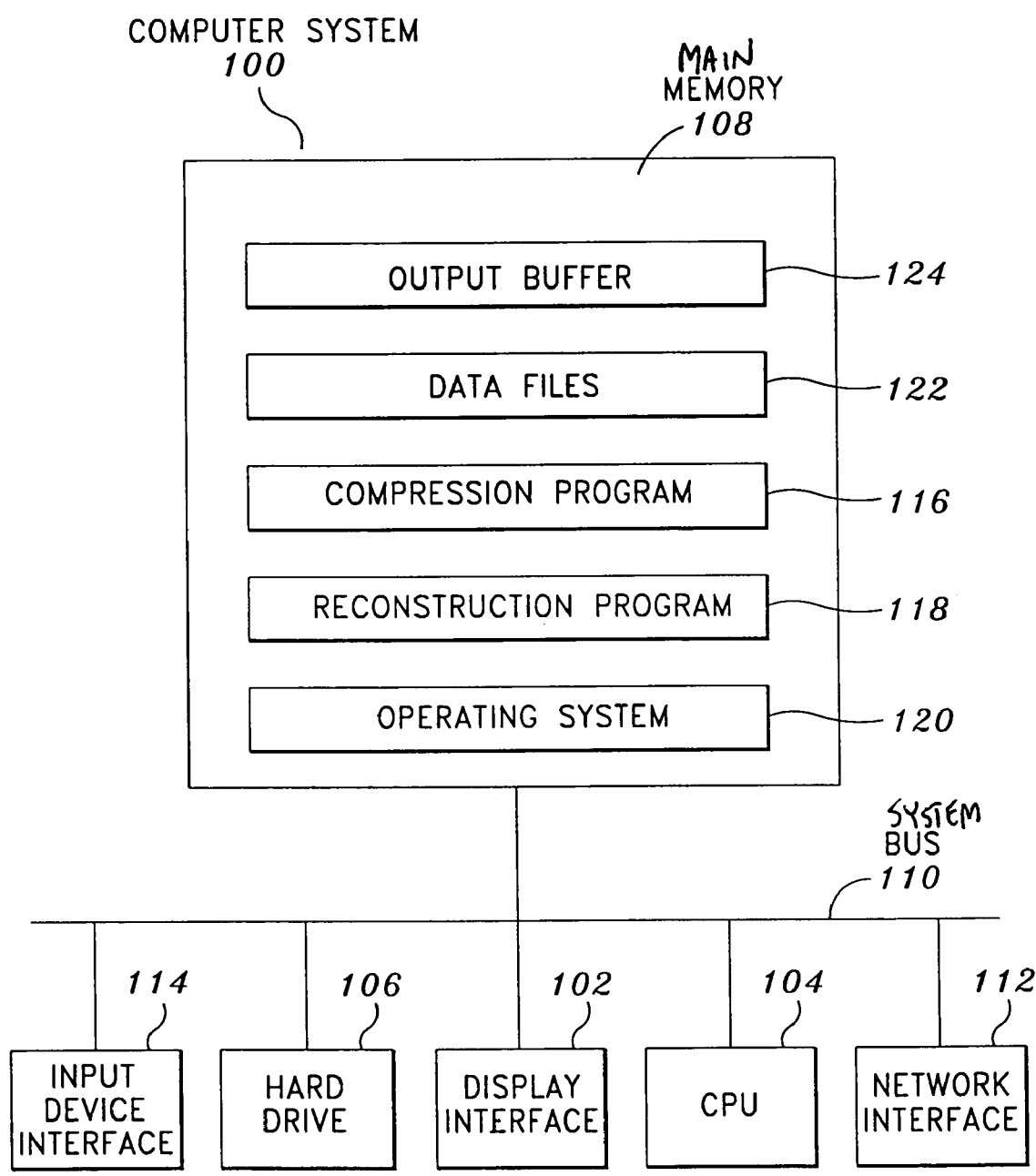
FIG. 1 is a functional block diagram of a computer in which the invention of the present invention can be carried out.

FIG. 1 is a block diagram of a computer system which implements the methods and computer program product in accordance with one embodiment of the present invention. Computer system 100 includes display interface 102 for visually displaying information to a computer user, central processing unit ("CPU") 104, hard drive 106, main memory 108, network interface 112, input device interface 114, and output buffer 124. As shown, the various components of computer system 100 communicate through system bus 110 or similar architecture. Typically, CPU 104 is a microprocessor, such as an INTEL® PENTIUM® processor, but CPU 104 may also be any processor that executes program instructions in order to carry out the functions of the present invention. Input device interface 114 provides the capability to input data to computer system 100. For example, input device interface 114 may include a keyboard (not shown) or a mouse (not shown). Network interface 112 provides for data to be transmitted and received over a network.

Main memory 108 stores data, such as compression program 116, reconstruction program 118, operating system 120, and plurality of data files 122. Data files 122 include, among other data, single image files which can be processed according to the present invention. Compression program 116 and reconstruction program 118 are computer program instructions executed by CPU 104 that are loaded into main memory 108. Compression program 116 and reconstruction program 118 implement the functions, as described in detail hereinafter, performed by the present invention. In addition, compression program 116 and reconstruction program 118 are stored on computer readable media and are used therefrom by computer system 100 to perform the specified functions or steps in accordance with the present invention. Operating system 120 provides overall system functionality. Output buffer 124 stores uncompressed image data for display on display interface 102.

In more detail, computer system 100 includes computer-readable storage medium, such as hard drive 106, in which is stored a program for compressing and/or reconstructing color image data. As shown in FIG. 1, the hardware environment includes computer system 100, display interface 102 for displaying text and images to a user, a keyboard for entering text data and user commands into computer system 100, a mouse for pointing, selecting and manipulating objects displayed on display interface 102, hard drive 106, a removable disk drive, a tape drive, a hardcopy output device, a computer network, network interface 112, and a digital input device.

Display interface 102 displays the graphics, images, and text that comprise the user interface for the software applications used by the present invention, as well as the operating system programs necessary to operate computer system 100. A user of computer system 100 uses a keyboard to enter commands and data to operate and control the computer operating system programs as well as the application programs. The user uses a mouse to select and manipulate graphics and text objects displayed on display interface 102 as part of the interaction with and control of computer system 100 and applications running on computer system 100. The mouse is any type of pointing device, including a joystick, a trackball, or a touch-pad without departing from the scope of the present invention. Furthermore, the digital input device allows computer system 100 to capture digital images, and is a scanner, digital camera or digital video camera.

The enhanced image compression mechanism application programs are stored locally on computer readable memory media, such as hard drive 106. In a further arrangement, hard drive 106 itself comprises a number of physical drive units, such as a redundant array of independent disks ("RAID"). In an additional arrangement, hard drive 106 is a disk drive farm or a disk array that is physically located in a separate computing unit. Such computer readable memory media allow computer system 100 to access color image data, image compression application data, computer-executable process steps, application programs and the like, stored on removable and non-removable memory media.

Network interface 112 is a modem connection, a local-area network ("LAN") connection including the Ethernet, or a broadband wide-area network ("WAN") connection such as a digital subscriber line ("DSL"), cable high-speed internet connection, dial-up connection, T-1 line, T-3 line, fiber optic connection, or satellite connection. The network is a LAN network, however in further arrangements of the present invention the network is a corporate or government WAN network, or the Internet.

The removable disk drive is a removable storage device that is used to off-load data from computer system 100 or upload data onto computer system 100. The removable disk drive is a floppy disk drive, an IOMEGA® ZIP® drive, a compact disk-read only memory ("CD-ROM") drive, a CD-Recordable drive ("CD-R"), a CD-Rewritable drive ("CD-RW"), a DVD-ROM drive, flash memory, a Universal Serial Bus ("USB") flash drive, pen drive, key drive, or any one of the various recordable or rewritable digital versatile disk ("DVD") drives such as the DVD-Recordable ("DVD-R" or "DVD+R"), DVD-Rewritable ("DVD-RW" or "DVD+RW"), or DVD-RAM. Operating system programs, applications, and various data files, such as image data files or image compression application programs, are stored on disks. The files are stored on hard drive 106 or on removable media for the removable disk drive without departing from the scope of the present invention.

The tape drive is a tape storage device that is used to off-load data from computer system 100 or upload data onto computer system 100. The tape drive is a quarter-inch cartridge ("QIC"), 4 mm digital audio tape ("DAT"), or 8 mm digital linear tape ("DLT") drive.

The hardcopy output device provides an output function for the operating system programs and applications including the enhanced image compression mechanism. The hardcopy output device is a printer or any output device that produces tangible output objects, including image data or graphical representations of image data. While the hardcopy output device is preferably directly connected to computer system 100, it need not be. For instance, in an alternate arrangement of the invention, the hardcopy output device is connected via a wired or wireless network connection.

Although computer system 100 has been described as a desktop PC, in further arrangements of the present invention computer system 100 is a laptop, a workstation, a midrange computer, a mainframe, or an embedded system.

The internal computing environment of computer system 100 includes CPU 104, where the computer instructions that comprise an operating system or an application, including the enhanced image compression mechanism, are processed; an interface which provides a communication interface and processing functions for rendering graphics, images, and texts on display interface 102; a keyboard interface which provides a communication interface to the keyboard; a pointing device interface which provides a communication interface to the mouse or an equivalent pointing device; a digital input interface which provides a communication interface to input device interface 114; a hardcopy output device interface which provides a communication interface to the hardcopy output device; random access memory ("RAM"), where computer instructions and data are stored in a volatile memory device for processing by CPU 104; read-only memory ("ROM"), where invariant low-level systems code or data for basic system functions such as basic input and output ("I/O"), startup, or reception of keystrokes from the keyboard are stored in a non-volatile memory device; physical media, which can comprise hard drive 106 and the removable disk drive, where the files that comprise operating system 120, application programs (including compression program 116, reconstruction program 118 and other applications) and data files 122 are stored; a modem interface which provides a communication interface to the computer network over a modem; and network interface 112 which provides a communication interface to the computer network over a computer network connection. The constituent devices and CPU 104 communicate with each other over system bus 110.

The RAM interfaces with system bus 110 so as to provide quick memory storage to CPU 104 during the execution of software programs such as the operating system application programs, and device drivers. More specifically, CPU 104 loads computer-executable process steps from hard drive 106 or other memory media into a field of RAM in order to execute software programs. Data, including data relating to the image compression, is stored in RAM, where the data is accessed by CPU 104 during execution.

Main memory 108 stores computer-executable code for windowing operating system 120, application programs such as word processing, spreadsheet, presentation, graphics, image processing, gaming, or other applications. Main memory 108 also stores compression program 116 and reconstruction program 118, which utilize an iterative region-growing algorithm for a partitioned image, growing regions based on the similarity or difference of color characteristics of non-overlapping regions of the image.

Figure 2A:
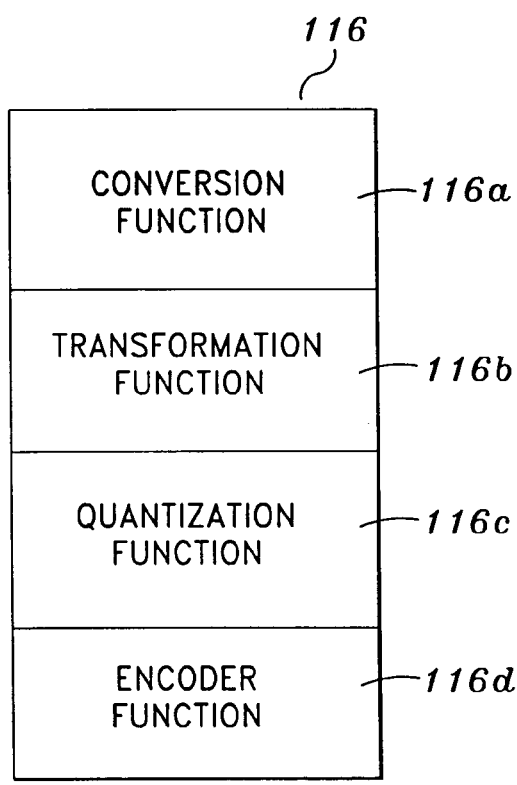
FIGS. 2A and 2B depict block diagrams of the routines that implement the method of the present invention.
Figure 2B:
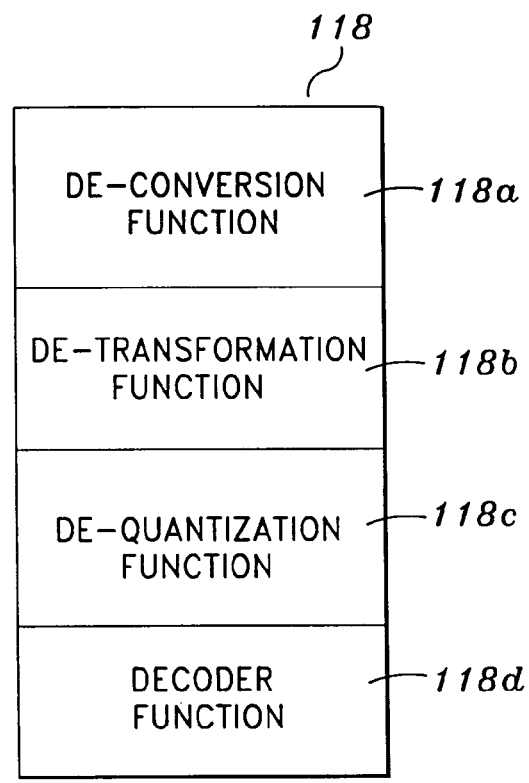

Referring ahead briefly to FIG. 2A, compression program 116 includes conversion function 116a, transformation function 116b, quantization function 116c, and encoder function 116d. As shown in FIG. 2B, reconstruction program 118 includes de-conversion function 118a, de-transformation function 118b, de-quantization function 118c, and decoder function 118d. As will be described in detail below, the present invention enables computer system 100, under the direction of compression program 116 and reconstruction program 118, to efficiently compress and reconstruct color images, respectively.

Although the compression and reconstruction of images is preferably implemented as shown, it is also possible to implement the image compression mechanism according to the present invention as a dynamic link library ("DLL"), or as a plug-in to other application programs, such the MICROSOFT® Internet Explorer web browser.

CPU 104 is one of a number of high-performance computer processors, including an INTEL® or AMD® processor, a POWERPC® processor, a MIPS® reduced instruction set computer ("RISC") processor, a SPARC® processor, an HP ALPHASERVER® processor, or a proprietary computer processor for a mainframe, without departing from the scope of the present invention. In an additional arrangement, CPU 104 in computer system 100 includes more than one processing unit, such as a multiple CPU configuration found in high-performance workstations and servers, or a multiple scalable processing unit found in mainframes.

Operating system 120 is: MICROSOFT® WINDOWS NT®/WINDOWS® 2000/WINDOWS® XP Workstation; WINDOWS NT®/WINDOWS® 2000/WIDOWS® XP Server; one of a variety of UNIX®-flavored operating systems, including AIX® for IBM® workstations and servers, SUNOS® for SUN® workstations and servers, LINUX® for INTEL® CPU-based workstations and servers, HP UX WORKLOAD MANAGER® for HP® workstations and servers, IRIX® for SGI® workstations and servers, VAX/VMS for Digital Equipment Corporation computers, OPENVMS® for HP ALPHASERVER®-based computers, MAC OS® X for POWERPC® based workstations and servers, or a proprietary operating system for mainframe computers.

While FIG. 1 illustrates a preferred embodiment of a computing system that executes program code, or program or process steps, configured to compress images using an iterative region-growing algorithm, other types of computing systems may also be used as well. In particular, one having ordinary skill in the art will recognize that the methods and computer program products in accordance with the present invention can be implemented on any system provided with a central processing unit, input/output circuitry, and memory.

Figure 3:
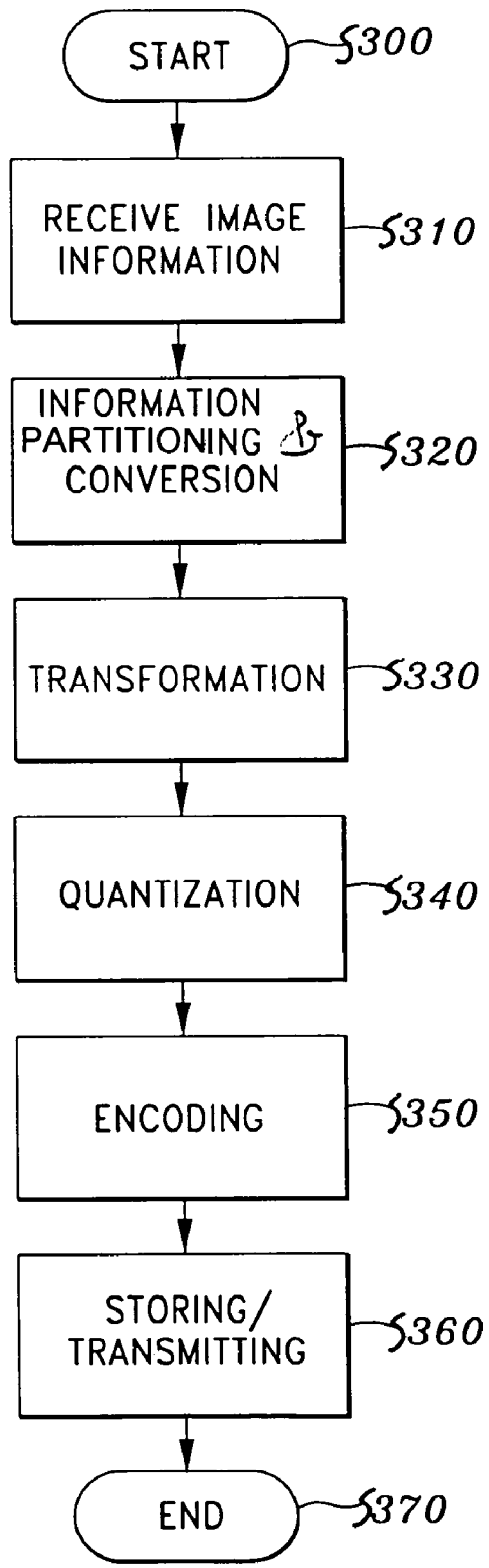
FIG. 3 is a flow diagram of the method performed in the computer of FIG. 1, in accordance with the present invention.

FIG. 3 is a flow diagram depicting the process for compressing a color image according to the present invention. Briefly, the method includes the steps of converting color image information for a color image into partitioned intrinsic color information, and transforming the partitioned intrinsic color information into transformed information. The method further includes the steps of quantizing the transformed information into quantized information, encoding the quantized information into encoded information, and storing the encoded information.

In more detail, the compression process begins (Step S300), and color image information or data for a color image is received (Step S310). For example, the received color image is a scanned raster image, a photograph from a digital camera, or a satellite image, such as an image obtained using SPACE IMAGING®'s IKONOS®, CNES/France's SPOT or the United States' LANDSAT® satellites. The received color image is obtained and designated in a variety of ways, such as by a user-initiated download, or upon the selection of an image feed, or by an automated periodic image capture.

The color image information includes a plurality of numerical value sets representing the received color image in one of a plurality of normal color space signal formats. A normal color space signal format is a set of numerical values which characterizes an image's colors in a particular color system using spectral weighting functions. Such color systems include but are not limited to a red-green-blue color space ("RGB color space"), a cyan-magenta-yellow color space ("CMY color space"), or a cyan-magenta-yellow-black color space ("CMYK color space").

In the RGB, CMY, or CMYK color space signal formats, a set of three numerical values (if RGB or CMY) or four numerical values (if CMYK) of the plurality of numerical value sets is associated with each pixel in the array of pixels for the received color image. In particular, this set of values in the normal color space signal format is expressed as a color triple or quadruple, such as (0,0,0) in the RGB color space, where each numerical value in the set corresponds to a color component used by the color system, and where the color components are used in combination by the particular color system to represent colors. For example, the set of three numerical values or color triple $0_R,0_G,0_B$ represents the color black, where the numerical values correspond respectively to the red, green, and blue components for generating the color black in the RGB color space. By varying the numerical values in a set of values in the color triple or quadruple, the representative color of the associated pixel varies. The plurality of numerical value sets enables the display of images for viewing on display interface 102, as well as the compression and reconstruction of an image.

The rationale for using luminance/chrominance color space in the DCT-based or DWT-based image compression mechanisms is that some chrominance information can be lost in an image, since the human eye is less likely to perceive the changes in the chrominance or color component of a reconstructed image. As a result, the chrominance components are sub-sampled or reduced, while the luminance component is left at full resolution. In the YUV luminance/chrominance color space, input color information is represented by three arrays of unsigned bytes, where each unsigned byte has a value between 0 and 255. The input of image information and the conversion of color image information between color spaces are well known in the art.

In Step S320, CPU 104 executes conversion function 116a, and the received image information is converted into partitioned intrinsic color information, using a principal components or Karhunen-Loeve ("KL") transform. The KL transform is a mathematical way of determining that linear transformation of a sample of points in N-dimensional space which exhibits the properties of the sample most clearly along the coordinate axes. Along the new axes the sample variances are extremes (maxima and minima), and uncorrelated. The name "principal component transform" comes from the principal axes of an ellipsoid (e.g. the ellipsoid of inertia), which are just the coordinate axes in question. KL transformation of input color information results in an increased overall compression ratio for the image compression mechanism.

According to the present invention transforms, data which was originally in the RGB, CMY, CMYK or other color space is converted into a principal components color space, using image specific color transformations. Both conventional JPEG and JPEG 2000 image compression mechanisms use a fixed color transformation in the encoding of an image. The present invention, however, produces a covariance matrix for the color image, and uses the covariance matrix to produce an eigenspace transformation that better allocates color information into the color components used in the JPEG or JPEG 2000 compression process. A principal components approach ensures that the luminance channel contains the maximum allowable image entropy. This results in better quality image transmission and reduced file size for a compressed image, as an effect of JPEG or JPEG 2000 compression.

The partitioned intrinsic color information expresses image pixel information such that the most information about an image is presented in the first component of a color triple or quadruple, where the intrinsic color information includes a plurality of value sets for the designated image. The plurality of value sets represents the designated image in a principal components space signal format. The principal components space signal format is based on, and defined by the color image's intrinsic color distribution statistics. The details for converting the received color image information into partitioned intrinsic color information using the KL transform is described in greater detail in the discussion of FIG. 4, below.

In Step S330, a forward DCT or DWT is applied to the partitioned intrinsic color information, generating transformed information (in the form of DCT or DWT coefficient vectors). In particular, CPU 104, under the instruction of transformation function 1116b, performs an approximation of the values in the plurality of intrinsic value sets in response to receiving the partitioned intrinsic color information generated in Step S320. Transformation function 116b applies trigonometric functions to the intrinsic color information, in accordance with the JPEG DCT compression standard, or algebraic functions to the intrinsic color information, in accordance with the JPEG 2000 DWT compression standard, to generate a plurality of approximation values.

The JPEG DCT is a relative of the Fourier transform and likewise gives a frequency map, where the DCT itself is reversible except for round-off error. The motivation for generating a frequency maps is that you can now throw away high-frequency information without impacting low-frequency information. The techniques and methods for implementing the JPEG DCT are well known in the art.

To perform the JPEG 2000 DWT, the present invention uses a one-dimensional sub-band decomposition of a one-dimensional set of samples into low-pass coefficients, representing a downsampled low-resolution version of the original set, and high-pass coefficients, representing a downsampled residual version of the original set, needed to reconstruct the original set from the low-pass set.

Using the JPEG DWT, the partitioned intrinsic color information is decomposed into different decomposition levels using the wavelet transform. These decomposition levels contain a number of sub-bands populated with coefficients that describe the horizontal and vertical spatial frequency characteristics of the original tile-component planes. The coefficients provide frequency information about a local area, rather than across the entire image like the Fourier Transform. Specifically, a small number of coefficients completely describes a single sample. A decomposition level is related to the next decomposition level by spatial powers of two, so each successive decomposition level of the sub-bands has approximately half the horizontal and half the vertical resolution of the previous decomposition level. Images of lower resolution than the original are generated by decoding a selected subset of these sub-bands. The techniques and methods for implementing the JPEG 2000 DWT are also well known in the art.

Although the transformation function is described herein as utilizing the JPEG DCT or JPEG 2000 DWT, it is to be understood that other DCT or DWT algorithms may also be used. As just one example, the present invention contemplates the use of any transformation that iteratively transforms one signal into two or more filtered and decimated signals corresponding to different frequency bands.

Figure 10:
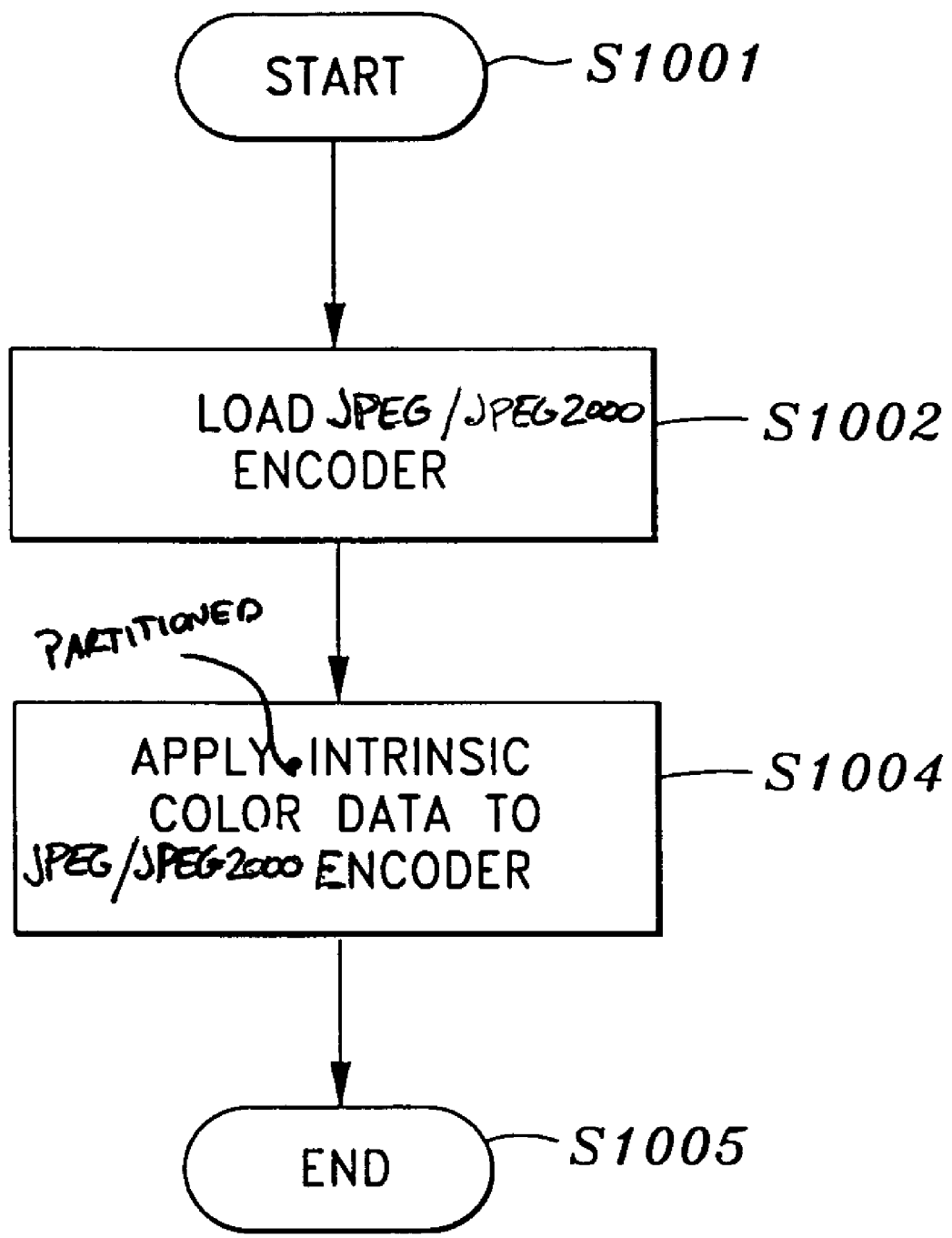
FIG. 10 is a flow diagram of the transformation function for JPEG DCT or JPEG 2000 DWT encoding according to one embodiment of the present invention.

FIG. 10 is a flow diagram of the transformation function for JPEG or JPEG 2000 images according to one embodiment of the present invention. Specifically, FIG. 10 further illustrates the process for transforming partitioned intrinsic color information into transformed information using a JPEG DCT or JPEG 2000 DWT algorithm. The process begins (Step S1001), and a JPEG or JPEG 2000 encoder is loaded from a data storage medium such as hard drive 106 into memory 108 (Step S1002). The partitioned intrinsic color data, which was converted from color image information in Step S320 by conversion function 116a, is applied to the JPEG or JPEG 2000 encoder (Step S1004), and the JPEG or JPEG 2000 encoder converts the intrinsic color data to transformed information, and the process ends (Step S1005). Transformation function 116b itself performs no data compression.

Returning to FIG. 3, in Step S340, CPU 104, under the instruction of quantizer function 116c, performs the quantization process in response to receiving the plurality of approximation values in Step S330. The quantization process reduces or truncates the DCT coefficients to a predetermined range of integer values, and thus, reduces the number of bits that are required to represent the approximation values.

Quantization is performed by dividing each approximation value by a predetermined value, where the predetermined value is obtained from an entry in a quantization table. JPEG, for example, defines a standard quantization table for the chrominance channel, and a standard quantization table for the luminance channels. Since the human eye is most sensitive to low frequencies and less sensitive to high frequencies, customized quantization tables can be scaled up or down to adjust the quality factor. Furthermore, one having ordinary skill in the art may vary the entries in the quantization table to optimize image compression of different types of images.

Also in Step S340, following the quantization operation, the quantized information (representing quantized DCT coefficients) is sequenced using a zigzag scan. The zigzag scan operation groups low-frequency coefficients at the top of a vector, mapping an 8×8 vector or 16×16 vector to a 1×64 or 1×256 vector, respectively, by winding through the quantized DCT coefficients on a zigzag path. The K×L rectangles are in 8×8 block increments. The process of zigzag scanning quantized DCT coefficients is also well known in the art.

In Step S350, under the instruction of encoding function 116d, CPU 104 performs the encoding process in response to receiving the plurality of quantized approximation values. The encoding process reduces the number of bits that are used to represent the quantized approximation values. The reduction can be accomplished using Huffman coding or arithmetic coding, although in alternate arrangements other encoding techniques are used. The coding replaces subsets of bit information corresponding to quantized approximation values with bit information that more efficiently represents the subsets of bit information.

The encoding process generates a reduced stream of bits which compactly represents the quantized approximation values in a non-redundant manner. The reduced bit stream generated by the encoding process corresponds to a compressed representation of the color image. The encoding step achieves additional lossless compression by encoding the quantized DCT coefficients more compactly based on their statistical characteristics. These and other techniques and methods for encoding information are well known in the art.

In Step S360, the reduced bit stream corresponding to the color image is stored as a file, and the process ends (Step S370). In one embodiment, the file can be stored in main memory 108 of computer system 100. In an alternative embodiment, the file can be transmitted to remote computer 900 at remote location using network interface 112 and stored in memory 902. A user may access the file from main memory 108 or memory 902, or the user may access the file at a future time for transmission and decompression. The resultant file has dramatic size and image quality improvements over conventional DCT-based or DWT-based image compression mechanisms. In addition, compression-specific non-pixel information generated by the conversion routine 116a is stored and/or transmitted in association with the reduced bit stream data and represents the quantized approximation values to enable the reconstruction of the color image.

The non-pixel data includes the polygon definitions and boundaries, the mean vector, the eigenmatrix and scale factors for each region of the particular image, where the non-pixel data is used to restore the color image to near original form during reconstruction. In one embodiment, compression-specific non-pixel information is provided inside JPEG or JPEG 2000 application-specific markers or tags, and stored in the file as ASCII or binary data. Alternatively, the bit stream is transmitted to computer 900 at a remote location using network interface 112, and stored in memory 902. One having ordinary skill in the art would recognize and appreciate such transmission modalities include but are not limited to modems and wireless devices.

The compression-specific non-pixel information is transmitted with the bit stream using markers or tags, and ultimately used by the remote system to reconstruct each compressed image.

The image compression mechanism, according to the present invention, optimizes channel usage, resulting in less degradation in image quality while allowing greater compression ratios over conventional, fixed transformation techniques. Moreover, the present invention is particularly relevant to DCT-based or DWT-based image compression mechanisms, since the range of compression ratios is extended, while maintaining image quality at high compression ratios.

Figure 4:
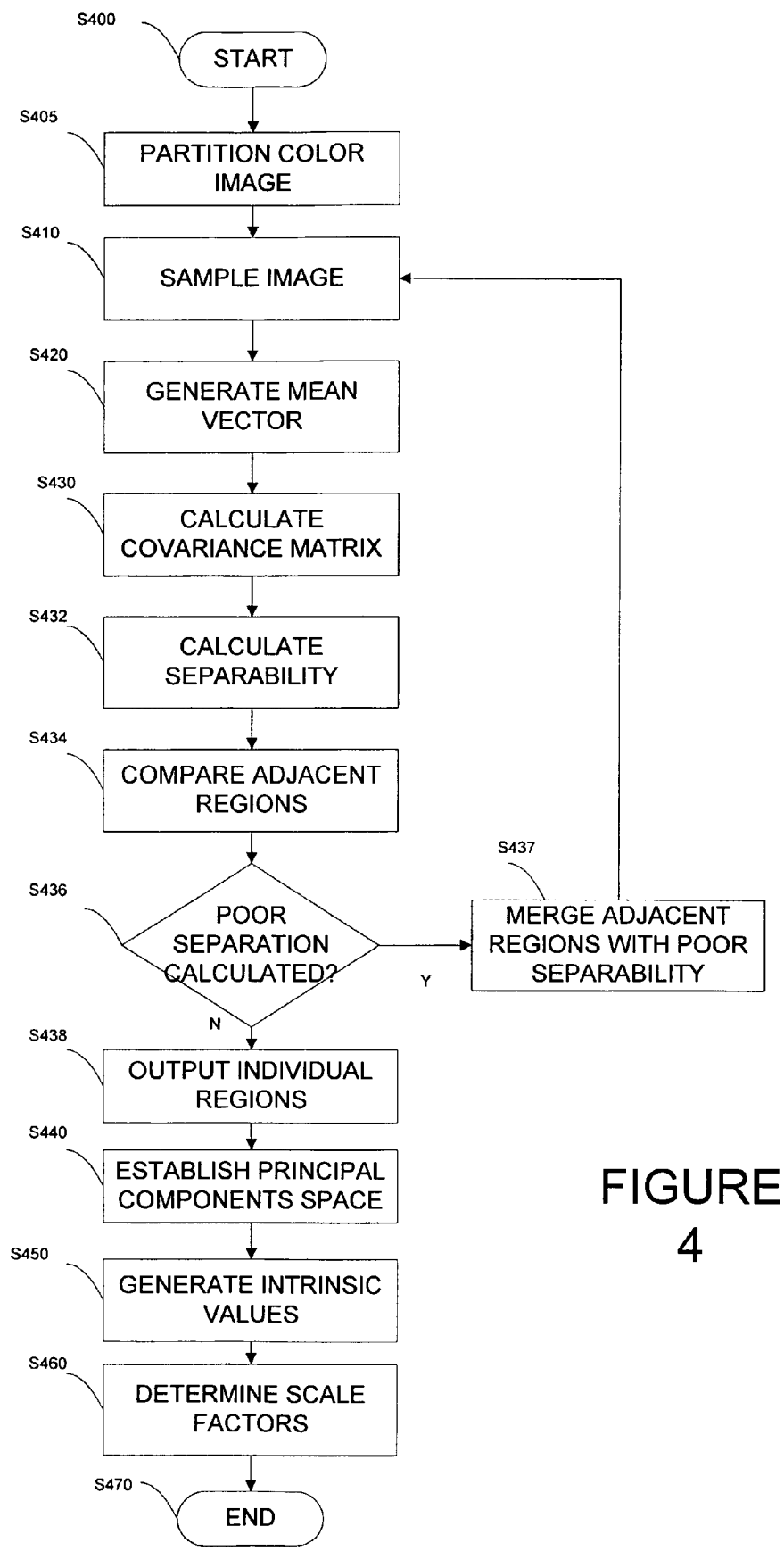
FIG. 4 is a flow diagram of the conversion function implemented by the method of the present invention.

FIG. 4 illustrates a block diagram of conversion function 116a of the present invention, which was discussed generally (above) in reference to FIG. 3. Briefly, conversion function 116a implements a method for compressing a color image, including the steps of partitioning color image information for a color image into a plurality of regions, including at least first and second adjacent regions, and computing a mean vector and a covariance matrix for each of the plurality of regions. Furthermore, the method includes the steps of computing divergence $D_{ij}$, transformed divergence $TD_{ij}$, and/or Jeffries-Matusita distance $JM_{ij}$ for the first and second adjacent regions, and merging the first and second adjacent regions, if $D_{ij}$, $TD_{ij}$, or $JM_{ij}$ indicate poor separation. Each of the plurality of regions is rectilinear, although in an alternative arrangement some of the plurality of regions are non-rectilinear.

Conversion function 116a implements a KL color transformation to generate partitioned intrinsic color information that is specific and unique to an individual color image. The KL transform uses a color image's color statistics and color distribution to compute and establish a principal components space having a coordinate system particular to the image. The axes of the principal components space are defined by the color distribution of the image, and thus the axes vary from image to image.

The KL transform begins (Step S400), and the input color information received in Step S310 is partitioned (Step S405). For a large true color image (of M pixels ×N pixels, where M and N are 2048 or larger), the enhanced image compression mechanism partitions the image into a plurality of smaller regions. For instance, the large true color image can be broken down into a plurality of rectilinear regions of K pixels ×L pixels, where K and L are greater than or equal to 256.

The partitioned color information is sampled (Step S410). According to one arrangement of the present invention, for each of the plurality of partitioned regions, the process samples every eighth pixel across in a row and down in a column starting from the upper left corner pixel to obtain a sufficient statistical sampling. This spacing may be varied under alternate arrangements. According to another arrangement, at least two thousand pixels are sampled for each image.

Figure 5:
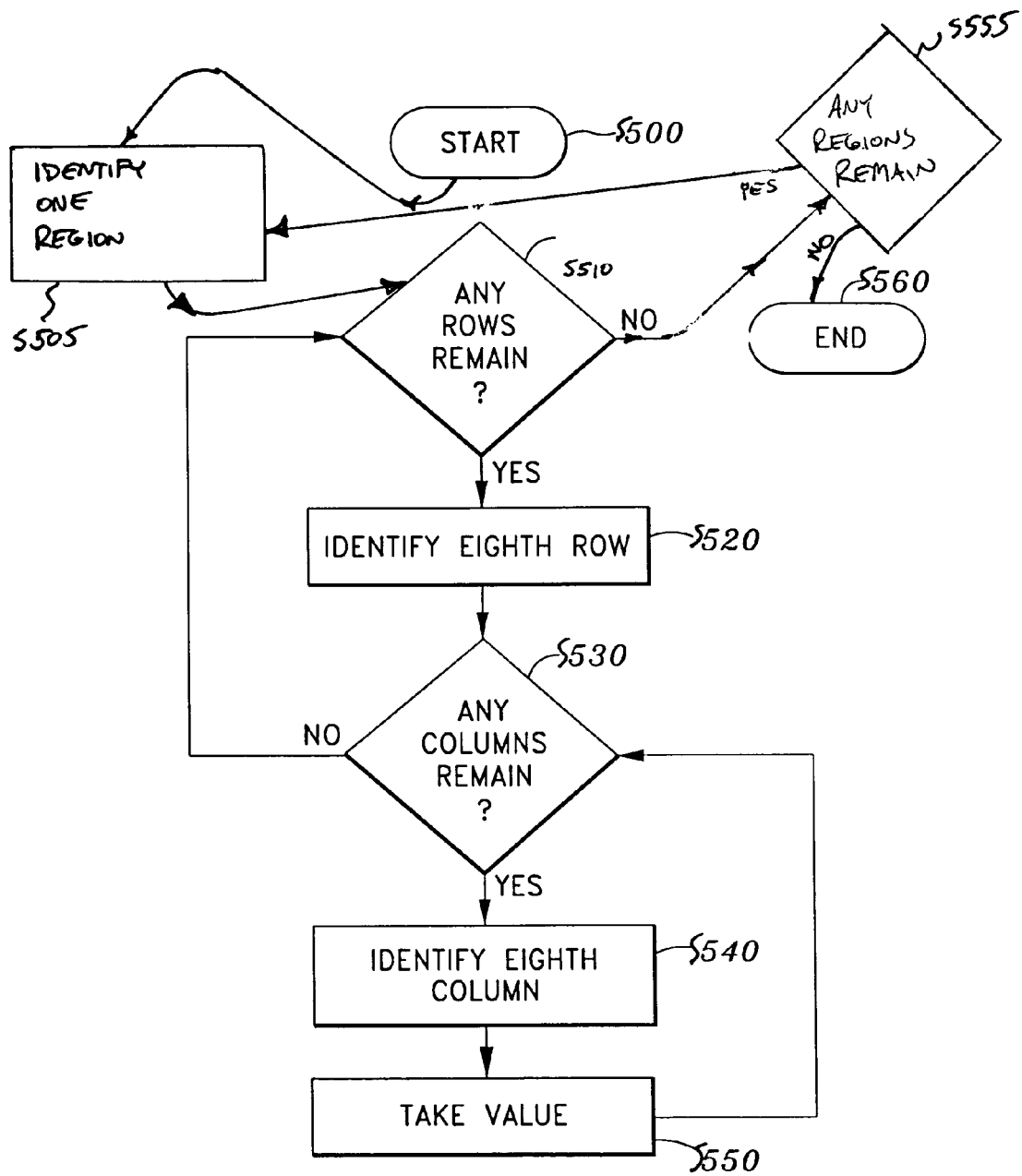
FIG. 5 is a flow diagram of the sampling algorithm performed for generating the mean vector of a color image.

FIG. 5 is a detailed flowchart depicting the sampling algorithm performed in Step S410. In Step S500, the process starts, and in Step S505 a first region of the plurality of partitioned regions is identified, and the pixel in the upper left corner of the partitioned region is identified. In Step S510, the process determines whether there are any remaining rows of pixels in the partitioned region to be sampled. If there are rows in the partitioned region to be sampled, the process proceeds to Step S520 where the sampling process identifies an eighth row of pixels in the partitioned region.

If there are no rows to be sampled in the partitioned region, the process jumps to Step S560. In Step S530, the process determines whether there are any remaining columns in the row of pixels to be sampled. If there are columns in the row of pixels to be sampled, the process proceeds to Step S540 where the sampling process identifies an eighth column in the row. If there are no columns to be sampled in the row, the process returns to Step S510. In Step S550, each value in the numerical value set for the pixel having the position corresponding to the identified row and column is taken and stored for subsequent statistical processing. In Step S555, once the partitioned region has been sampled, a determination is made as to whether additional partitioned regions remain to be sampled. If additional regions need to be sampled, the next unsampled region is identified (Step S505), and the pixel in the upper left corner of the next unsampled region is identified for further processing, in Step S510. If no unsampled regions remain, the sampling process terminates (Step S560).

Returning again to FIG. 4, in Step S420, for each of the plurality of regions, all the numerical values taken for each respective color component from sampled pixels are added together to calculate a total component value for the respective color component. For example, all the red color component values from the sampled pixels for the first region are added to produce a red component total value. The green and blue components total values are generated in a like manner. Once calculated, each of the color component totals are divided by the number of pixels sampled in the respective region, producing the mean vector of the partitioned region. The generated mean vector is stored for later use as non-pixel data.

The mean vector consists of three floating-point numbers and is represented by the formula $m=(m_R\ m_G\ m_B)^T$. Each floating-point number of the mean vector corresponds to the average value of the respective color component for each partitioned region, as designated by the subscript, of sampled pixels. For example, the floating-point number $m_R$ will be the average of the red color component values for the sampled pixels. One having ordinary skill in the art will recognize that the sampling frequency and sampling set size can be modified without departing from the scope and spirit of the invention claimed herein. Furthermore, in an alternate embodiment of the present invention, if a mean vector has already been generated for the same region (under circumstances which are described in detail below), the mean vector generation step for that particular region is omitted, for the sake of computational efficiency.

In Step S430, a covariance matrix is computed for each of the plurality of partitioned regions, using the mean vectors generated in Step S420. In many image processing procedures, the relationships between two bands of data are important. Covariance measures the tendencies of data file values in the same pixel, but in different bands, to vary with each other, in relation to the means of their respective bands, where the bands are linear. Theoretically, where variance is the average square of the differences between values and their mean in one band, covariance is the average product of the differences of corresponding values in two different bands from their respective means.

Figures 6, 7:
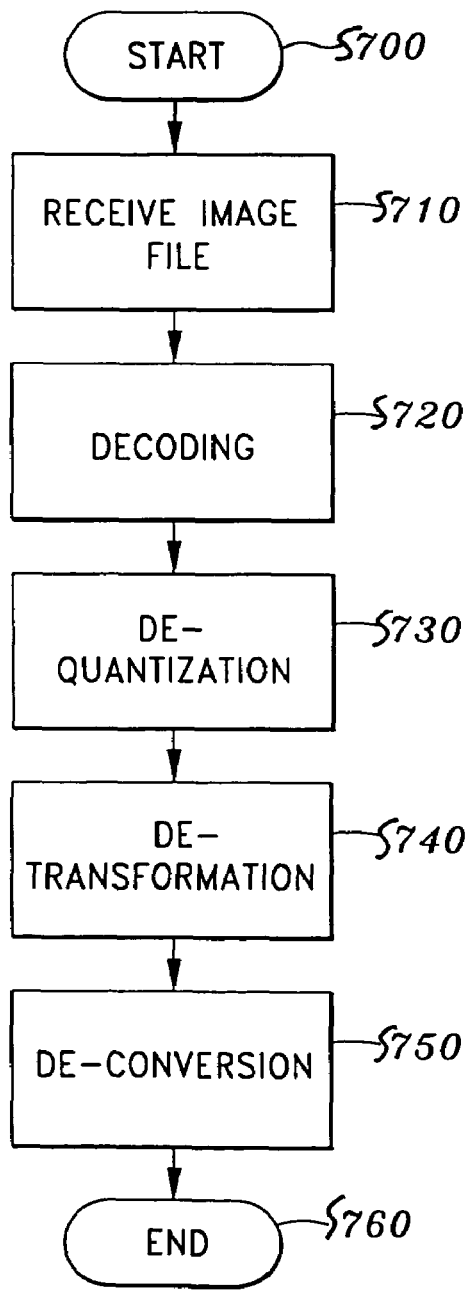
FIG. 6 is an illustration of the covariance matrix generated by the conversion function.
FIG. 7 is a block diagram of the process for reconstructing a color image, depicted as a block diagram.

In further detail, the covariance matrix is a 3×3 floating point matrix, computed by the formula $C=E[(p-m)(p-m)^T]$, where p represents the numerical value set of a pixel in the partitioned region, m represents the mean vector of the partitioned region, and E represents the expected value of the original partitioned region. The covariance matrix is generated for the sampled points by subtracting each floating-point number of the mean vector from its corresponding color component value in the numerical value set of a sampled pixel. The 3×3 covariance matrix C is illustrated in FIG. 6 with equations shown for obtaining each entry from the native RGB color triples. In an alternate embodiment of the present invention, if a covariance matrix has already been generated for the same region (again, under circumstances which are described in detail below), the covariance matrix calculation step for that particular region is omitted, for the sake of computational efficiency.

Returning again to FIG. 4, in Step S432, separability is calculated for each adjacent region. Signature separability is a statistical measure of distance between two signatures. The formulas to calculate separability are related to the maximum likelihood decision rule, therefore evaluating signature separability helps predict the results of a maximum likelihood classification. There are three options for calculating separability, where each formula takes into account the covariances and signatures in the bands being compared, as well as the mean vectors of the signatures.

Separability is calculated using computing divergence $D_{ij}$, transformed divergence $TD_{ij}$, and/or Jeffries-Matusita distance $JM_{ij}$ for each of the plurality of partitioned images. More particularly, for each region, it is determined which other regions are adjacent to that region. For each adjacent region pair, $D_{ij}$, $TD_{ij}$, and/or $JM_{ij}$ are calculated using each region's individual color characteristics.

$D_{ij}$ is expressed by Equation (1), below:

$$D_{ij} = \frac{1}{2}tr((C_i - C_j)(C_i^{-1} - C_j^{-1})) + \frac{1}{2}tr((C_i^{-1} - C_j^{-1})(\mu_i - \mu_j)(\mu_i - \mu_j)^T) \quad (1)$$

In Equation (1), $C_i$ represents the covariance matrix for the first region, $C_j$ represents the covariance matrix for the second region, $\mu_i$ represents the mean vector for the first region, $\mu_j$ represents the mean vector for the second region, tr represents a trace function, and T represents a transposition function.

$TD_{ij}$ is expressed by Equations (1) and (2), below:

$$D_{ij} = \frac{1}{2}tr((C_i - C_j)(C_i^{-1} - C_j^{-1})) + \frac{1}{2}tr((C_i^{-1} - C_j^{-1})(\mu_i - \mu_j)(\mu_i - \mu_j)^T) \quad (1)$$

$$TD_{ij} = 2000\left(1 - \exp\left(\frac{-\text{Abs}(D_{ij})}{8}\right)\right), \quad (2)$$

In Equations (1) and (2), $C_i$ represents the covariance matrix for the first region, $C_j$ represents the covariance matrix for the second region, $\mu_i$ represents the mean vector for the first region, $\mu_j$ represents the mean vector for the second region, tr represents a trace function, and T represents a transposition function.

Transformed divergence gives an exponentially decreasing weight to increasing distances between classes. The scale of divergence values can range from 0 to 2000, and interpreting the results after applying transformed divergence requires an analysis of those numerical divergence values. Generally, if the result is greater than 1900, then the classes have good separability. Between 1700 and 1900, the separation is fairly good. Below 1700, the separation is poor.

$JM_{ij}$ is expressed by Equations (3) and (4):

$$a = \frac{1}{8}(\mu_i - \mu_j)^T\left(\frac{C_i + C_j}{2}\right)^{-1}(\mu_i - \mu_j) + \frac{1}{2}\ln\left(\frac{|(C_i + C_j)/2|}{\sqrt{\text{Abs}(|C_i| \times |C_j|)}}\right) \quad (3)$$

$$JM_{ij} = 1000 \times \sqrt{2(1 - e^{-a})}. \quad (4)$$

In Equations (3) and (4), $C_i$ represents the covariance matrix for the first region, $C_j$ represents the covariance matrix for the second region, $\mu_i$ represents the mean vector for the first region, $\mu_j$ represents the mean vector for the second region, $|C_i|$ represents a determinant of $C_i$, and $|C_j|$ represents a determinant of $C_j$.

The Jeffries-Matusita distance has a saturating behavior with increasing class separation like transformed divergence, however it is not as computationally efficient as transformed divergence. Both transformed divergence and Jeffries-Matusita distance have upper and lower bounds. If the calculated divergence is equal to the appropriate upper bound, then the signatures can be separable in the affected bands. A calculated divergence of zero means that the signatures are inseparable.

In any regard, the above equations are used on two regions of pixels representing different surface materials. Two easily-computed mathematical quantities are employed: a mean signature vector (a vector of K components) and a covariance matrix (a K×K matrix) for each region. The above equations can be used to determine whether two regions of color pixels have different color characteristics, where K is 3 for RGB color spaces, and 4 for CMYK color spaces.

In Step S434, the separability of physically adjacent regions is compared. In particular, the values for $D_{ij}$, $TD_{ij}$, and/or $JM_{ij}$ are compared with a predetermined threshold separability value, to determine the amount of separation between the two adjacent regions, in order to determine whether the color characteristics or color distribution statistics of the two adjacent regions are similar. In one example, the transformed divergence value is compared to a predetermined threshold separability value of 1700, where a $TD_{ij}$ of less than 1700 results in a determination of poor separability.

In Step S436, if the separation of any two adjacent regions is poor, as determined in Step S434, the process proceeds to Step S437. If the separation of any two adjacent regions is not poor, as determined in Step S434, the process proceeds to Step S438. If the separability between two adjacent regions is poor, the color distribution statistics of the two adjacent regions are judged to be sufficiently similar to warrant a merger between the two existing adjacent regions, resulting in a new, larger merged region and the elimination of the identity of the two smaller regions.

The iterative region-growing method proceeds to Step S437 if it is determined that at least two adjacent regions have poor separation. In Step S437 each adjacent region pair with poor separation is merged, and processing continues to Step S410 with the two regions merged into one region. As such, the mean vector and covariance matrix for the merged region will be calculated and compared with physically adjacent regions surrounding the augmented region. By repeating the non-pixel data recalculation process each time an adjacent region pair are merged, the process is deemed to be iterative.

Although the processes described in Steps S410 to S437 include calculations which may be repeated each time two adjacent regions are merged, it is not necessarily required to regenerate a mean vector (Step S420) or recalculate the covariance matrix (Step S430) for regions which were not merged with an adjacent region in a previous iteration, since those values would presumably be unchanged. Thus, in an alternate arrangement of the present invention, a mean vector is generated (Step S420) and a covariance matrix is calculated (Step S430) only for regions which have been merged and do not have values calculated for the merged region.

In Step S438, if it is determined that no two adjacent regions have poor separation, none of the regions are merged any further, and each region is output individually. By "individually," it is intended that output region could be a region that was originally partitioned in Step S405 and never merged, or a larger region comprising two or more merged regions which were previously separate.

In Step S440 the statistical color distribution of each obtained and designated region is used to establish a principal components space for each region. The principal components space is a coordinate system that uses the mean vector as the center of the system. As the center of the principal components space, the mean vector reduces the elimination of color information that has a high concentration in the image. The regions statistical color distribution is considered when the eigenvalues of the covariance matrix C, and the respective eigenvectors are generated using the formula $Ct_k = e_k t_k$, where t represents an eigenvector, e represents an eigenvalue, and C represents the covariance matrix generated in Step S430 for each region. The subscript k ranges from 1 to 3. This can be accomplished using known programming packages for solving eigensystems (e.g., LINPACK, EISPACK).

The first eigenvector generated represents the first coordinate axis in principal components space. This first eigenvector passes through the center of the principal components space in a direction that explains the most color variation from the mean vector. In addition, the first value in a value set of the intrinsic color information corresponds to a coordinate on the first coordinate axis. The second eigenvector generated represents the second coordinate axis in principal components space. The second eigenvector is orthogonal to the first eigenvector and explains as much of the remaining color variance as possible. The second value in a value set of the intrinsic color information corresponds to a coordinate on the second coordinate axis. The third eigenvector generated represents the third coordinate axis in principal components space. The third principal component is orthogonal to the first and second eigenvectors and explains the remaining color variation. The third value in a value set of the intrinsic color information corresponds to a coordinate on the third coordinate axis.

The first, second and third eigenvectors are arranged into an eigenmatrix T. Eigenmatrix T is specific to the region since the eigenvectors are defined by the image's color statistics, and thus varies from region to region. Moreover, the matrix has the property that the transpose of eigenmatrix T is its own inverse. Accordingly, eigenmatrix T is used to convert a color image represented, for example, in RGB color space to principal components color space. In a like manner, the transpose of eigenmatrix T is used to convert a color image represented in principal components color space to RGB color space. The generated eigenmatrix T is stored as non-pixel data.

In Step S450, the sets of numerical values which characterize each region in a normal color space are converted into intrinsic color value sets that characterize the region in principal components space. The conversion uses the mean vector for each of the plurality of partitioned regions (generated in Step S420) and the eigenmatrix for each region (generated in Step S440) to generate intrinsic color values that characterize the region in principal components space. The formula for performing the conversion is defined by $p^c = T(p-m)$, where T is the eigenmatrix, m is the mean vector and p is the numerical value set of a pixel in the image. The intrinsic color value sets in principal components space are generated by subtracting the mean vector values from corresponding color component values in a numerical value set and multiplying the results of the subtractions by eigenmatrix T. The intrinsic value sets are a plurality of three floating point values that correspond to the first, second and third principal component space coordinates. This conversion is performed for each numerical value set of a region to produce a corresponding number of intrinsic color value sets.

In Step S460, scale factors are generated to enable the principal components space coordinates to be mapped into integer byte values. The scale factors include scale and offset values, in the form of floating point numbers, for each axis in principal components space. To compute the scale and offset values, the minimum and maximum principal components space coordinates for each principal components space axis must be identified. Upon identifying the minimum and maximum principal space coordinates, scale and offset values are determined to map principal components space coordinates from the range [min . . . max] into the range [0 . . . 255], where [0. . . 255] is the range of values an unsigned byte quantity can assume. The offset values correspond to the minimum coordinate values associated with each principal coordinate axis. Accordingly, the minimum coordinate value on each axis is selected as the offset for the axis. The scale values correspond to the maximum coordinate values subtracted from the minimum coordinate values for each principal coordinate axis divided by 255. The scale and offset values are stored for later use as non-pixel data.

In Step S470, the process terminates. Upon completion, the plurality of intrinsic value sets of the intrinsic color information is provided to the transformation function 116b described above for approximation and quantization using DCT or DWT.

In one arrangement, the algorithm depicted in FIG. 4 grows rectilinear regions, since square or rectangular shapes require less transmission of region definition information. In an alternative arrangement, the algorithm sends a sequence of pixel coordinate vertices that define the perimeters of the polygonal regions, along with the effective mean vector, eigenvectors and scale factors for each of the plurality of partitioned or merged regions.

The region-growing algorithm iterates until no additional region merging can be done. At completion, the algorithm sends polygon definitions for each region along with color transformation information specific to that region. This information is either stored in the header of the compressed data file, or interspersed throughout the compressed data.

FIG. 7 is a block diagram depicting the process for reconstructing a color image. The reconstruction can be performed on any computer system 100 or 900 having the reconstruction program stored therein. Briefly, the present invention is a method for reconstructing a color image. The method includes the steps of receiving encoded information for the color image, decoding the encoded information into quantized information, and de-quantizing the quantized information into transformed information. The method further includes the steps of de-transforming the transformed information into intrinsic color information, using an inverse of a discrete wavelet transform algorithm, and de-converting the intrinsic color information into color image information.

In more detail, the reconstruction process begins (Step S700), and in Step S710 a file is received including information corresponding to an image, compressed using the technique described in FIGS. 3 to 6. Accordingly, the information provided in the file is reduced image information and non-pixel data. In Step S720, CPU 104, under the instruction of decoder function 118*d*, performs an inverse encoding process. The inverse encoding process replaces the reduced image information, which is a stream of bits that compactly represents the image in a non-redundant manner, with a bit stream that originally represented the color image. More specifically, the bit stream that originally represented the quantized approximation values is generated. The techniques and methods for decoding information are well known in the art.

In Step S730, CPU 104, under the instruction of dequantization function 118*c*, performs an inverse quantization process in response to receiving the bit stream that originally represented the quantized approximation values. The dequantization process returns the plurality of quantized approximation values to there near original range of approximation values. As in the quantization Step S340 above, the process is achieved using a quantization table.

In Step S740, CPU 104, under the instruction of transformation function 118*b*, performs an inverse approximation of the original approximation values. The process generates a plurality of value sets that are substantially similar to the original plurality of intrinsic value sets. The transformation function 118*b* applies the inverse of the JPEG DCT or JPEG 2000 DWT to generate the plurality of value sets that are substantially similar to the original plurality of intrinsic value sets. The techniques and methods for implementing the inverse JPEG DCT or JPEG 2000 DWT are well known in the art. Specifically, in order to implement an inverse JPEG 2000 DWT, the present invention uses a one-dimensional sub-band recomposition of a one-dimensional set of samples from low-pass and high-pass coefficient.

In Step S750, the substantially similar plurality of intrinsic value sets are converted back to numerical value sets that characterize the color image in normal color space. The conversion of the intrinsic value sets to numerical value sets is accomplished using the non-pixel data. The process converts the values of the intrinsic value sets from floating point numbers to unsigned byte numbers. In Step S760 the process ends, and information corresponding to the numerical values sets are transmitted to the output buffer 124 for display on display interface 102.

Figure 8:
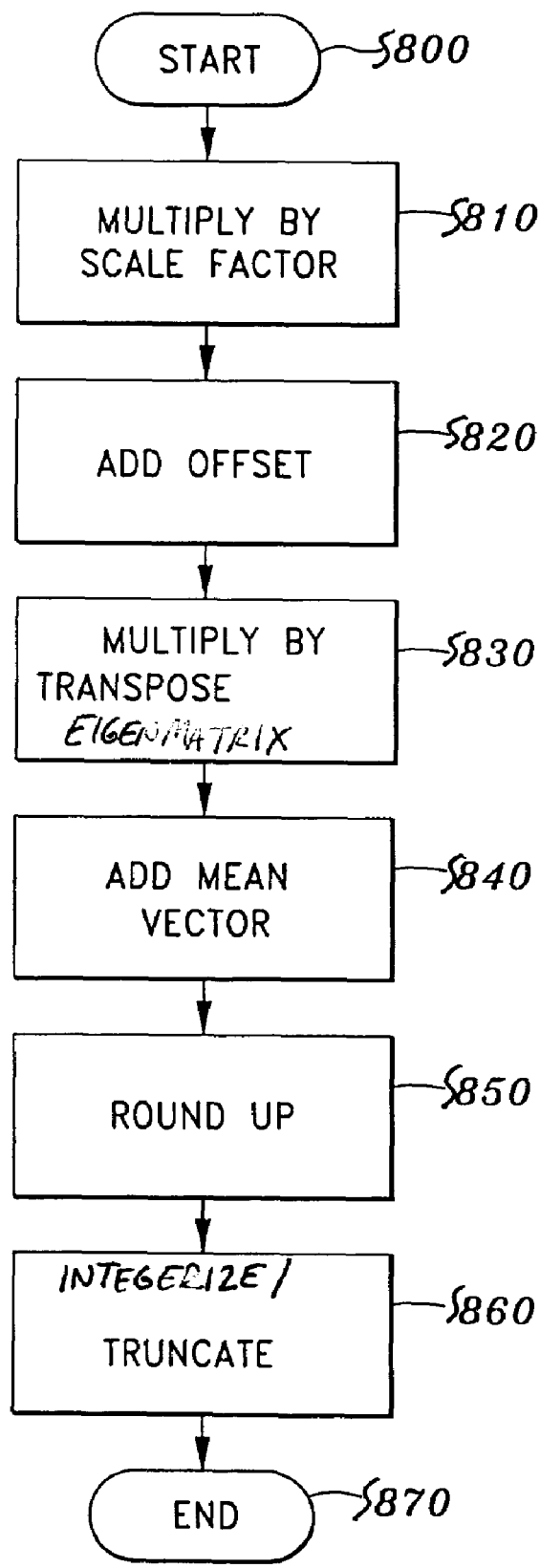
FIG. 8 is a flow diagram for the method of converting the plurality of intrinsic value sets to numerical value sets.

The method of converting the plurality of intrinsic value sets to numerical value sets is depicted in FIG. 8. This process is performed using region-specific data, using a separate transform for each region. In Step S800 the process begins, and in Step S810 each principal coordinate value in an intrinsic value set is multiplied by its corresponding scale factor. This step is repeated for each intrinsic value set that is in the plurality of intrinsic value sets. In Step S820, each principal coordinate value in an intrinsic value set is added to its corresponding offset. Like Step S810, this step is repeated for each intrinsic value set that is in the plurality of intrinsic value sets. In Step S830, each intrinsic value set in the plurality of intrinsic value sets is multiplied by the transpose of the eigenmatrix T. In Step S840, the mean vector is added to each intrinsic value in the plurality of intrinsic value sets. In Step S850, a value of 0.5 is added to each intrinsic value in the plurality of intrinsic value sets. In Step S860, each intrinsic value in the plurality of intrinsic value sets is truncated to a whole value. In addition, intrinsic values that are less than zero are made equal to zero and intrinsic values that are greater than 255 are made equal to 255. The process terminates in Step S870.

Figure 9:
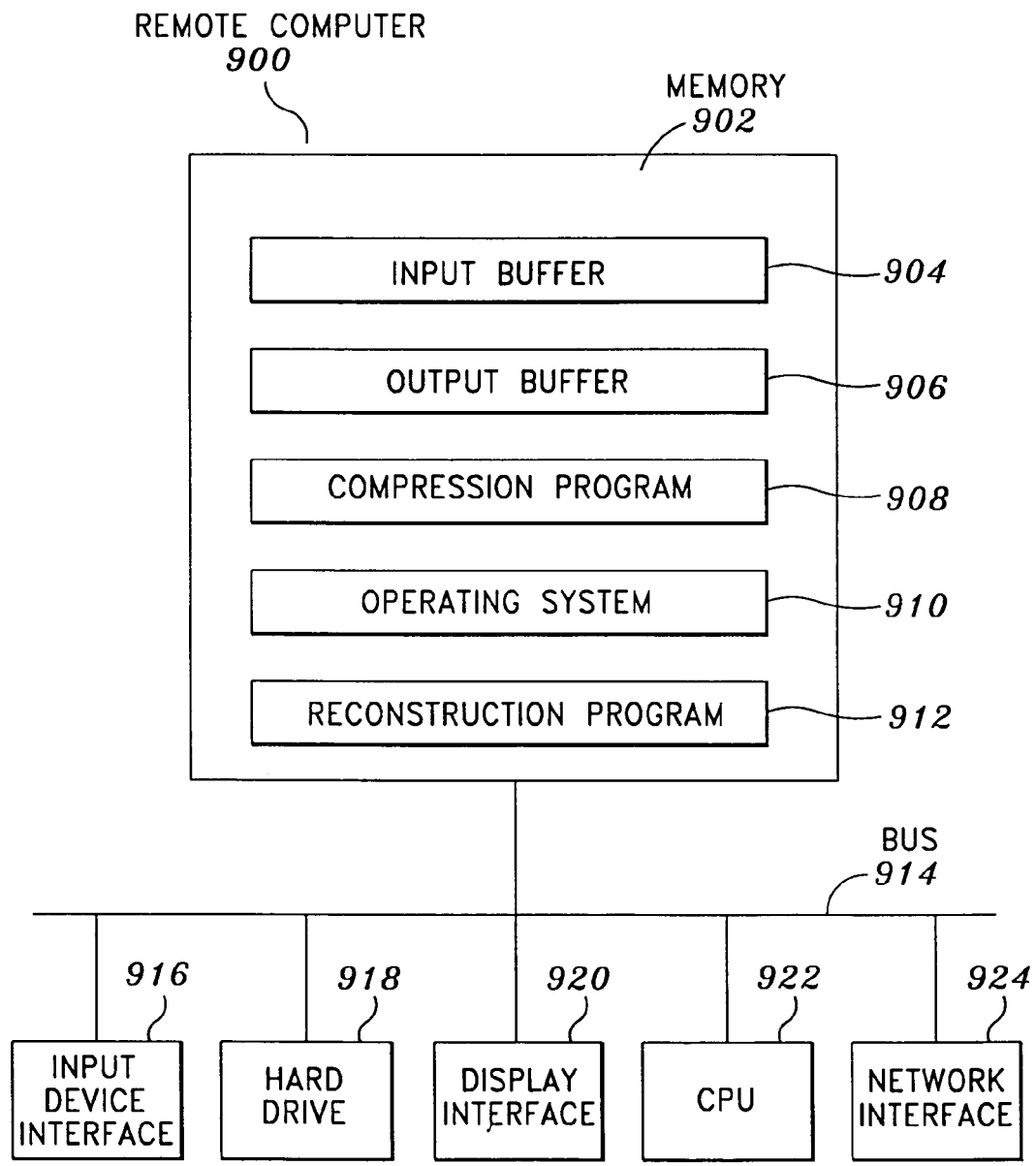
FIG. 9 is a functional block diagram of a remote computer in which the invention of the present invention can be carried out.

FIG. 9 simply represents a remote computer 900 in which the present invention can also be practiced. Remote computer 900 is similar to computer system 100 of FIG. 1, and the similar components are therefore not described again for the sake of brevity. The difference between remote computer 900 and computer system 100 is that memory 902 of remote computer 900 includes input buffer 904 instead of data files. In this manner, remote computer 900 receives data files, such as an image, from a remote source.

The present invention is described below with reference to flowchart illustrations of methods, apparatus, and computer program products. It is understood that each block of the flowchart illustrations, and combinations of blocks in the flowchart illustrations, can be implemented by computer program instructions. These computer program instructions may be loaded onto a general-purpose computer, special purpose computer, or other programmable data processing apparatus to produce a machine. These computer program instructions, which execute on the computer or other programmable data processing apparatus, create means for implementing the functions specified in the flowchart block or blocks. These computer program instructions may be stored in a computer-readable memory to direct a computer or other programmable data processing apparatus to function in a particular manner, producing an article of manufacture including means which implement the function specified in the flowchart block or blocks. The computer program instructions may also be loaded onto a computer or other programmable data processing apparatus to cause a series of operational steps to be performed, producing a computer implemented process, such that the computer or other programmable apparatus provide steps for implementing the functions specified in the flowchart block or blocks. In one implementation, these computer program instructions are written in the C programming language. It is to be appreciated, however, that these routines may be implemented in any of a wide variety of programming languages.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

The present invention has been described above with reference to the accompanying drawings that show preferred embodiments of the invention. The present invention, however, may be embodied in many different forms and should not be construed as limited to the embodiments set forth herein. Appropriately, these embodiments are provided so that this disclosure will be thorough and complete, and will fully convey the scope of the invention. As will be appreciated by one having skill in the art, the present invention may be embodied as a method, data processing system, or computer program product.

Although specific embodiments of the present invention have been described, it will be understood by those skilled in the art that there are other embodiments that are equivalent to the described embodiments. Accordingly it is to be understood that the invention is not to be limited by the specific illustrated embodiments, but only by the scope of the appended claims.

What is claimed is:

1. A computer-readable storage medium in which is stored a program for compressing a color image, the program comprising codes for permitting a computer to perform:
   a converting step for converting color image information for the color image into partitioned intrinsic color information;
   a transforming step for transforming the partitioned intrinsic color information into transformed information;
   a quantizing step for quantizing the transformed information into quantized information;
   an encoding step for encoding the quantized information into encoded information; and
   a storing step for storing the encoded information.

2. The computer-readable storage medium according to claim 1, wherein, during the converting step, the program further comprises codes for permitting the computer to perform:
   a partitioning step for partitioning the color image information into a plurality of regions, including at least first and second adjacent regions;
   a first computing step for computing a mean vector and a covariance matrix for each of the plurality of regions;
   a second computing step for computing divergence $D_{ij}$, transformed divergence $TD_{ij}$, and/or Jeffries-Matusita distance $JM_{ij}$ for the first and second adjacent regions; and
   a merging step for merging the first and second adjacent regions, if $D_{ij}$, $TD_{ij}$, or $JM_{ij}$ indicate poor separation.

3. The computer-readable storage medium according to claim 2, wherein, during the converting step, the program further comprises codes for permitting the computer to perform:
   a third computing step for computing a mean vector and a covariance matrix for the merged first and second adjacent region;
   a fourth computing step for computing $D_{ij}$, $TD_{ij}$, and/or $JM_{ij}$ between the merged first and second adjacent region and a third adjacent region adjacent to the merged first and second adjacent region; and
   a second merging step for merging the merged first and second adjacent region with the third adjacent region, if $D_{ij}$, $TD_{ij}$, or $JM_{ij}$ indicate poor separation between the merged first and second adjacent region and the third adjacent region.

4. The computer-readable storage medium according to claim 2, wherein each of the plurality of regions is rectilinear.

5. The computer-readable storage medium according to claim 4, wherein each of the plurality of regions measures K pixels ×L pixels.

6. The computer-readable storage medium according to claim 5, wherein K equals L.

7. The computer-readable storage medium according to claim 5, wherein K and/or L are 256, initially.

8. The computer-readable storage medium according to claim 5, wherein K and/or L are 512, initially.

9. The computer-readable storage medium according to claim 5, wherein K and/or L grow by multiples of 8.

10. The computer-readable storage medium according to claim 2, wherein $D_{ij}$ is expressed by:

$$D_{ij} = \frac{1}{2}tr((C_i - C_j)(C_i^{-1} - C_j^{-1})) + \frac{1}{2}tr((C_i^{-1} - C_j^{-1})(\mu_i - \mu_j)(\mu_i - \mu_j)^T)$$

wherein $C_i$ represents the covariance matrix for the first region, $C_j$ represents the covariance matrix for the second region, $\mu_i$ represents the mean vector for the first region, $\mu_j$ represents the mean vector for the second region, tr represents a trace function, and T represents a transposition function.

11. The computer-readable storage medium according to claim 2, wherein $TD_{ij}$ is expressed by:

$$D_{ij} = \frac{1}{2}tr((C_i - C_j)(C_i^{-1} - C_j^{-1})) + \frac{1}{2}tr((C_i^{-1} - C_j^{-1})(\mu_i - \mu_j)(\mu_i - \mu_j)^T)$$

$$TD_{ij} = 2000\left(1 - \exp\left(\frac{-\text{Abs}(D_{ij})}{8}\right)\right)$$

wherein $C_i$ represents the covariance matrix for the first region, $C_j$ represents the covariance matrix for the second region, $\mu_i$ represents the mean vector for the first region, $\mu_j$ represents the mean vector for the second region, tr represents a trace function, and T represents a transposition function.

12. The computer-readable storage medium according to claim 2, wherein $JM_{ij}$ is expressed by:

$$a = \frac{1}{8}(\mu_i - \mu_j)^T\left(\frac{C_i + C_j}{2}\right)^{-1}(\mu_i - \mu_j) + \frac{1}{2}\ln\left(\frac{|(C_i + C_j)/2|}{\sqrt{\text{Abs}(|C_i| \times |C_j|)}}\right)$$

$$JM_{ij} = 1000 \times \sqrt{2(1 - e^{-a})}.$$

wherein $C_i$ represents the covariance matrix for the first region, $C_j$ represents the covariance matrix for the second region, $\mu_i$ represents the mean vector for the first region, $\mu_j$ represents the mean vector for the second region, $|C_i|$ represents a determinant of $C_i$, and $|C_j|$ represents a determinant of $C_j$.

13. The computer-readable storage medium according to claim 2, wherein poor separation is indicated if $TD_{ij}$ is between 0 and 1700.

14. The computer-readable storage medium according to claim 2, wherein poor separation is indicated if $JM_{ij}$ is between 0 and 1000.

15. The computer-readable storage medium according to claim 1, wherein the color image comprises greater than or equal to 4,000,000 pixels.

16. The computer-readable storage medium according to claim 1, wherein the transforming step uses a discrete cosine transform.

17. The computer-readable storage medium according to claim 16, wherein the discrete cosine transform is a JPEG discrete cosine transform.

18. The computer-readable storage medium according to claim 1, wherein the transforming step uses a discrete wavelet transform.

19. The computer-readable storage medium according to claim 18, wherein the discrete wavelet transform is a JPEG 2000 discrete wavelet transform.

20. The computer-readable storage medium according to claim 1, wherein, during the converting step, the program further comprises codes for permitting the computer to perform:

an establishing step for establishing a principal components space, a generating step for generating intrinsic values, and a determining step for determining scale factors.

21. A method for compressing a color image, comprising the steps of:

converting color image information for the color image into partitioned intrinsic color information;

transforming the partitioned intrinsic color information into transformed information;

quantizing the transformed information into quantized information;

encoding the quantized information into encoded information; and storing the encoded information.

22. The method for compressing a color image according to claim 21, wherein the converting step further comprises the steps of:

partitioning the color image information into a plurality of regions, including at least first and second adjacent regions;

computing a mean vector and a covariance matrix for each of the plurality of regions;

computing divergence $D_{ij}$, transformed divergence $TD_{ij}$, and/or Jeffries-Matusita distance $JM_{ij}$ for the first and second adjacent regions; and merging the first and second adjacent regions, if $D_{ij}$, $TD_{ij}$, or $JM_{ij}$ indicate poor separation.

23. The method for compressing a color image according to claim 22, wherein $D_{ij}$ is expressed by:

$$D_{ij} = \frac{1}{2} tr((C_i - C_j)(C_i^{-1} - C_j^{-1})) + \frac{1}{2} tr((C_i^{-1} - C_j^{-1})(\mu_i - \mu_j)(\mu_i - \mu_j)^T)$$

wherein $C_i$ represents the covariance matrix for the first region, $C_j$ represents the covariance matrix for the second region, $\mu_i$ represents the mean vector for the first region, $\mu_j$ represents the mean vector for the second region, tr represents a trace function, and T represents a transposition function.

24. The method for compressing a color image according to claim 22, wherein $TD_{ij}$ is expressed by:

$$D_{ij} = \frac{1}{2} tr((C_i - C_j)(C_i^{-1} - C_j^{-1})) + \frac{1}{2} tr((C_i^{-1} - C_j^{-1})(\mu_i - \mu_j)(\mu_i - \mu_j)^T)$$

$$TD_{ij} = 2000\left(1 - \exp\left(\frac{-Abs(D_{ij})}{8}\right)\right)$$

wherein $C_i$ represents the covariance matrix for the first region, $C_j$ represents the covariance matrix for the second region, $\mu_i$ represents the mean vector for the first region, $\mu_j$ represents the mean vector for the second region, tr represents a trace function, and T represents a transposition function.

25. The method for compressing a color image according to claim 22, wherein $JM_{ij}$ is expressed by:

$$a = \frac{1}{8}(\mu_i - \mu_j)^T \left(\frac{C_i + C_j}{2}\right)^{-1} (\mu_i - \mu_j) + \frac{1}{2} \ln\left(\frac{|(C_i + C_j)/2|}{\sqrt{Abs(|C_i| \times |C_j|)}}\right)$$

$$JM_{ij} = 1000 \times \sqrt{2(1 - e^{-a})}$$

wherein $C_i$ represents the covariance matrix for the first region, $C_j$ represents the covariance matrix for the second region, $\mu_i$ represents the mean vector for the first region, $\mu_j$ represents the mean vector for the second region, $|C_i|$ represents a determinant of $C_i$, and $|C_j|$ represents a determinant of $C_j$.

26. The method for compressing a color image according to claim 21, wherein the converting step further comprises the steps of:

establishing a principal components space;

generating intrinsic values; and determining scale factors.

27. A method for compressing and reconstructing a color image, comprising the steps of:

converting color image information for the color image into partitioned intrinsic color information;

transforming the partitioned intrinsic color information into transformed information;

quantizing the transformed information into quantized information;

encoding the quantized information into encoded information;

storing the encoded information; and reconstructing the encoded information.

28. The method for compressing a color image according to claim 27, wherein the converting step further comprises the steps of:

partitioning the color image information into a plurality of regions, including at least first and second adjacent regions;

computing a mean vector and a covariance matrix for each of the plurality of regions;

computing divergence $D_{ij}$, transformed divergence $TD_{ij}$, and/or Jeffries-Matusita distance $JM_{ij}$ for the first and second adjacent regions; and merging the first and second adjacent regions, if $D_{ij}$, $TD_{ij}$, or $JM_{ij}$, indicate poor separation.

29. A system for compressing a color image, comprising:

a memory for storing color image information for the color image; and a computer processor for compressing the stored color image information, by performing the steps of:

a) converting color image information for the color image into partitioned intrinsic color information;

b) transforming the partitioned intrinsic color information into transformed information;

c) quantizing the transformed information into quantized information;

d) encoding the quantized information into encoded information; and e) storing the encoded information.

30. The system for compressing a color image according to claim 29, wherein the computer processor performs the converting step by further performing the steps of:
  i) partitioning the color image information into a plurality of regions, including at least first and second adjacent regions;
  ii) computing a mean vector and a covariance matrix for each of the plurality of regions;
  iii) computing divergence $D_{ij}$, transformed divergence $TD_{ij}$, and/or Jeffries-Matusita distance $JM_{ij}$ for the first and second adjacent regions; and
  iv) merging the first and second adjacent regions, if $D_{ij}$, $TD_{ij}$, or $JM_{ij}$ indicate poor separation.

* * * * *